(No Model.)
F. L. WATEROUS.
FRICTION CLUTCH.
No. 501,976. Patented July 25, 1893.
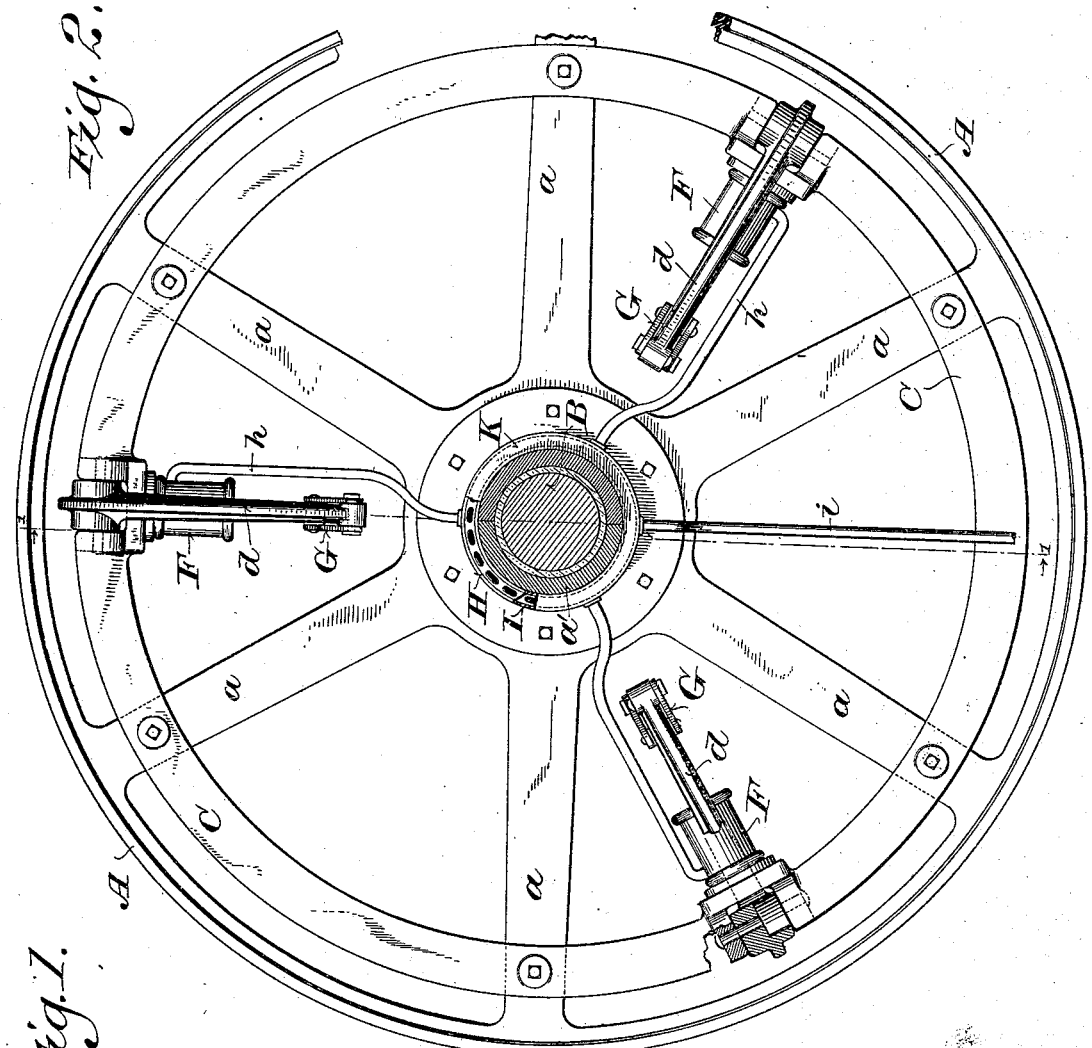
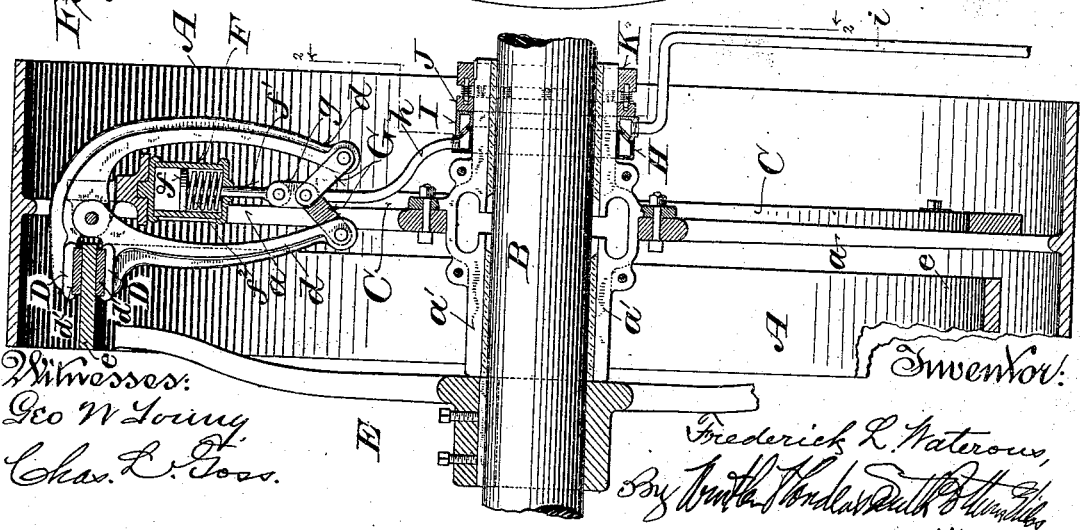

UNITED STATES PATENT OFFICE.

FREDERICK L. WATEROUS, OF SOUTH ST. PAUL, MINNESOTA.

FRICTION-CLUTCH.

SPECIFICATION forming part of Letters Patent No. 501,976, dated July 25, 1893.

Application filed May 15, 1893. Serial No. 474,314. (No model.)

*To all whom it may concern:*

Be it known that I, FREDERICK L. WATEROUS, of South St. Paul, in the county of Dakota and State of Minnesota, have invented certain new and useful Improvements in Friction-Clutches; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to employ fluid pressure for the operation of the jaws of a friction clutch, either when constructed and arranged to couple and uncouple line shafting, or to rigidly connect a loose pulley with the shaft upon which it is mounted.

It consists essentially of one or more cylinders and pistons, attached to and movable with the jaw carrier, a link or toggle joint connection between the piston rod of each piston and the arms of the adjacent jaws, connections by which fluid pressure is supplied from a fixed source to the cylinder or cylinders without interfering with the free movement of the jaw carrier, and of certain novel features in the construction and arrangement of the component parts of the clutch hereinafter particularly described and pointed out in the claims.

In the accompanying drawings like letters designate the same parts in both figures.

Figure 1 is a section of a friction clutch pulley embodying my improvements, taken in a plane coinciding with the axis of the pulley and indicated by dotted line 1, 1, Fig. 2; and Fig. 2 is a partial side elevation and a partial section in a plane cutting the axis of the pulley transversely and indicated by dotted line 2, 2, Fig. 1.

A represents a pulley, loosely mounted upon the shaft B.

C is a ring bolted or otherwise secured to the arms $a\,a$ of the pulley and constituting therewith and with the hub $a'$, the jaw carrier of the clutch.

D D are the jaws, which are formed with arms $d\,d$, projecting radially toward the center of the pulley and fulcrumed together to the ring C between spokes $a\,a$ of the pulley or jaw carrier. The jaws are preferably faced with blocks $d'\,d'$ of wood or other suitable wearing material, and are located on opposite sides of the interposed rim $e$ of a wheel E, which is fixed upon the shaft B next to one end of the pulley hub $a'$. For each pair of jaws a cylinder F is secured to the ring C between the arms $d\,d$ of said jaws, and is provided with a piston $f$ and piston rod $f'$, passing in a radial direction from said piston through the inner head of the cylinder toward the center of the pulley. It is connected by a link $g$ with a toggle joint G, connecting the inner ends of the arms $d\,d$. The link $g$ distributes the force applied to closing the jaws equally between the two jaws, producing equal engagement between them and the rim of the friction wheel and compensating for any imperfections in workmanship or adjustment, or any inequality of wear. A spring $f^2$ interposed between the piston and inner head of each cylinder, tends to draw the arms $d\,d$ together and to carry and hold the jaws out of contact with the interposed rim $e$ of the friction wheel E. By arranging the cylinders and pistons with their piston rods projecting radially toward the center of the clutch between the arms of the jaws with which they are connected, the clutch mechanism is comprehended within a small compass wholly inside of the rim of the pulley, and at the same time a great leverage is secured upon the jaws.

Upon one end of the hub $a'$ is fixed a hollow ring H, which is connected by pipes $h\,h$ with the outer ends of the several cylinders F F. This ring is formed in one side, which is preferably inclined to its axis, with apertures, which are arranged to register with corresponding apertures in the contiguous and corresponding face of a hollow ring I, loosely mounted upon said hub, and held snugly against the ring H by an axially movable ring J, between which and a ring K fixed upon said hub, are interposed upon guide pins, springs located at suitable intervals from each other, as shown in Fig. 1. The rings H, J and K it will be observed, turn with the hub $a'$, the rings H and K being rigidly secured thereto, while the ring J is freely movable lengthwise of the hub, but the ring I, connected by a pipe $i$ with an air compressor or other source of fluid pressure, does not turn with said hub. By means of these connections it is obvious that fluid pressure may be constantly supplied from a stationary source to the cylinders F F, whether they are in motion or at rest. The beveled perforated faces of the hollow rings H and I are accurately fitted to each other, and afford an air tight joint, which wears evenly, and the wear of which is automatically taken up by the spring actuated ring J.

It is obvious that the clutch may be readily adapted for coupling and uncoupling line shafting by fixing the friction wheel E upon the end of one part, and the jaw carrier upon the adjacent end of the other part of the shaft.

Compressed air is preferably employed for the actuating medium, but any other suitable fluid may be used.

Various changes in the minor details of construction may be made within the scope of my invention.

I claim—

1. In a friction clutch the combination with a friction wheel, of a jaw carrier provided with jaws pivotally connected therewith, a cylinder, a piston adapted to work therein, and a toggle joint connecting the piston with said jaws, substantially as and for the purposes set forth.

2. In a friction clutch, the combination of a friction wheel, a jaw carrier provided with jaws pivotally connected therewith and having inwardly projecting arms, a radially arranged cylinder mounted upon said jaw carrier, a piston working therein having an inwardly projecting piston rod, and a toggle joint connecting the arms of said jaws with each other and with the piston rod, substantially as and for the purposes set forth.

3. In a friction clutch, the combination of a friction wheel, a jaw carrier provided with jaws pivotally connected therewith and having inwardly projecting arms, a cylinder and piston mounted upon said jaw carrier, a link connection between the piston rod and the arms of said jaws, and a spring interposed between said piston and one of the cylinder heads, substantially as and for the purposes set forth.

4. In a friction clutch, the combination of a friction wheel, a jaw carrier, jaws pivotally connected therewith and provided with arms, a cylinder and piston mounted upon the jaw carrier and connected through the piston rod with said arms, and hollow rings, one fixed and the other loosely mounted upon the hub of the jaw carrier and having registering openings in their contiguous faces, the fixed ring having a connection with said cylinder and the loose ring with a source of fluid pressure, substantially as and for the purposes set forth.

5. In a friction clutch, the combination of a friction wheel, a jaw carrier, jaws pivotally connected therewith and provided with arms, a cylinder and piston mounted upon the jaw carrier and connected through the piston rod with said arms, hollow rings, one fixed and the other loosely mounted upon the hub of the jaw carrier and having registering openings in their contiguous faces, the fixed ring having a connection with said cylinder and the loose ring with a source of fluid pressure, and an axially movable spring-actuated ring pressing against the opposite side of said loose hollow ring, substantially as and for the purposes set forth.

6. In a friction clutch, the combination of a friction wheel, a jaw carrier, radially movable jaws arranged on opposite sides of the rim of the friction wheel and pivotally connected with said jaw carrier, said jaws being formed or provided with inwardly extending arms, a cylinder and piston mounted upon said jaw carrier between said arms, a piston rod projecting radially through the inner head of the cylinder, and a toggle joint connecting said arms and linked to said piston rod, substantially as and for the purposes set forth.

In testimony that I claim the foregoing as my own I affix my signature in presence of two witnesses.

FRED. L. WATEROUS.

Witnesses:
 FRANK J. WATEROUS,
 W. HOLMES.